Oct. 20, 1942.                B. L. CASNER                2,299,679
                          ELECTRIC WELDING TORCH
                           Filed Oct. 28, 1940
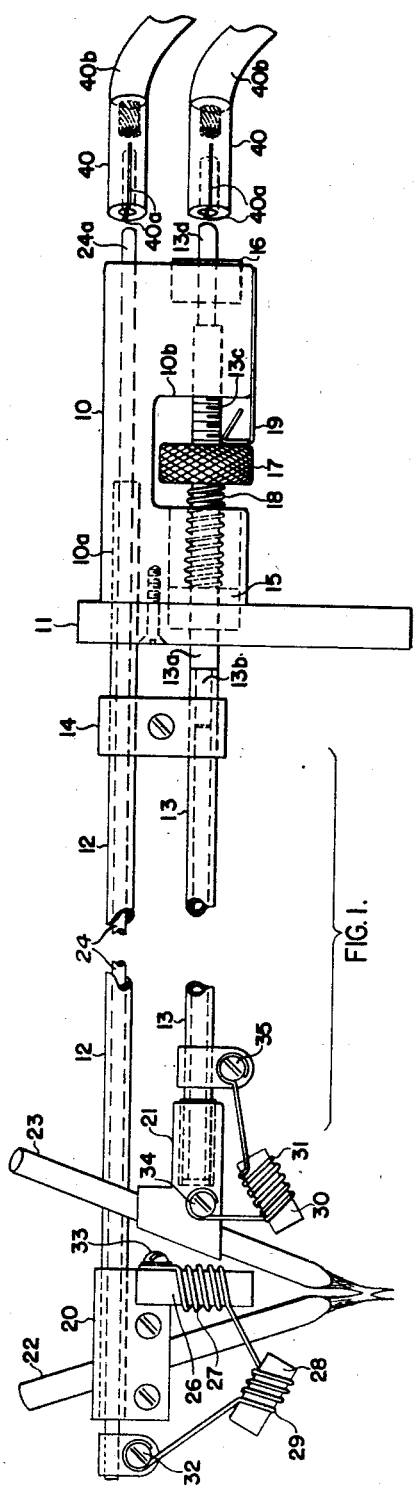
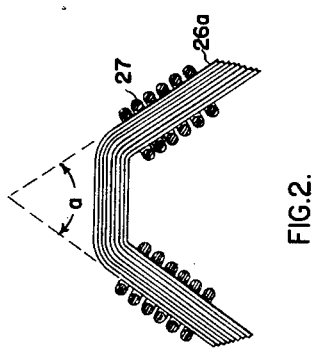
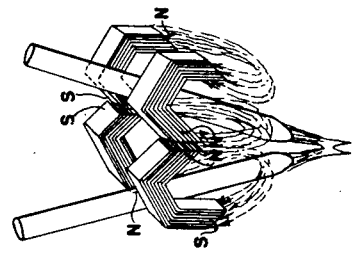
INVENTOR
BURTON L. CASNER
BY Laurence B Dodds
ATTORNEY Patented Oct. 20, 1942

2,299,679

UNITED STATES PATENT OFFICE 2,299,679

ELECTRIC WELDING TORCH

Burton L. Casner, Hoboken, N. J.

Application October 28, 1940, Serial No. 363,097

5 Claims. (Cl. 219—14)

This invention relates to electric welding torches and, more particularly, to such welding torches of the type by which the welding arc can be concentrated in a point in the general nature of the flame produced by an oxy-acetylene torch.

Heating, cutting, and welding torches of the prior art, other than those utilizing electrodes composed of welding material, are generally of the oxy-acetylene or like chemical combustion type. While such torches are generally satisfactory in performance, they have a number of disadvantages among which is the limitation that they are not readily portable because they cannot be far separated from the source of combustion material, usually heavy and cumbersome high-pressure gas tanks. On the other hand, electric welding torches, as contrasted to electric welders utilizing consumable welding electrodes, have occasionally been proposed in the prior art. However, such torches have not been commercially acceptable since, in general, the arc formed thereby flares out over a wide area, which is undesirable both because it tends to heat too large a portion of the work and because it is not sufficiently intense to perform many cutting and welding operations.

It is an object of the present invention, therefore, to provide an improved electric welding torch effective to develop an intense, concentrated, point-like arc.

It is a further object of the invention to provide an improved electric welding torch of the type described in which the arc is concentrated into a point and is stable under all working conditions.

In accordance with the invention, there is provided an electric welding torch comprising a supporting member and a pair of electrode holders supported thereby and adapted to hold a pair of current-carrying electrodes at an angle to each other and in arc-forming position. There is disposed within the angle of the normal electrode positions a first magnetic means for forming a magnetic field transverse to the normal path of the arc to extend it away from the torch, while other magnetic means are disposed outside the angle of the normal electrode positions for developing a magnetic field in the region of the arc to concentrate the arc into substantially a point.

In accordance with another feature of the invention, a pair of substantially parallel rods are supported from the supporting member and the electrode holders are individually supported by the rods, one of the rods being longitudinally adjustable relative to the other to adjust the electrodes to strike, control or extinguish the arc, and there is provided resilient means for biasing the adjustable rod to a position effective to extinguish the arc.

For a better understanding of the invention, together with other and further objects thereof, reference is had to the following description taken in connection with the accompanying drawing and its scope will be pointed out in the appended claims.

Referring now to the drawing, Fig. 1 is a view in side elevation, partly broken away, of an improved welding torch embodying the present invention; Fig. 2 is a detailed cross-sectional view of a preferred form of the magnets included in the torch of Fig. 1; while Figs. 3a and 3b are schematic diagrams illustrating the nature of the magnetic fields developed by the magnets used in the torch of the invention.

Referring now to Fig. 1 of the drawing, the electric welding torch there illustrated comprises a supporting member or handle 10, preferably of suitable insulating material, such as vulcanized fibre, Bakelite, or the like, to one end of which there is fixed a shield 11 which may be of similar material. Supported from the handle 10 are a pair of longitudinally extending rods 12 and 13, the rod 12 being rigidly secured in the handle 10 as by driving it into a force fit in the recess 10a. In the preferred arrangement illustrated, the rods 12 and 13 lie in a plane normally substantially parallel to the palm of the hand of the user. The rod 13 may be tubular in form, having a solid extension 13a with a portion 13b of reduced section driven into the end of the tubular portion. The extension 13a is longitudinally adjustable within the handle 10, sliding in bushings 15 and 16 secured at opposite ends of the handle 10 and carrying a guide 14 sliding on the fixed rod 12. The rod 13 is threaded over a portion of its length, as indicated at 13c, and co-operates with a thumb nut 17 disposed thereon and movable in a recess 10b of the handle member 10. The thumb nut 17 is biased by a coil spring 18, or equivalent, to one extreme position in which the electrodes of the torch are in an inactive position. However, the thumb nut 17 may be retained at an intermediate position in the recess 10b, corresponding to an operating position of the electrodes, by means of a spring finger or latch 19 secured to the handle 10.

On the ends of the rods 12 and 13 remote from the handle 10 are rigidly secured the electrode holders 20 and 21, respectively, adapted to hold a pair of welding electrodes 22 and 23, respectively, preferably carbon electrodes, in arc-forming position, the holder 21 being suitably insulated from rod 13. The electrode holders 20 and 21 hold the electrodes 22 and 23, respectively, in an offset position so that these electrodes normally lie substantially in a plane parallel to that including the supporting rods 12 and 13 and at an angle to each other preferably less than 90 degrees and between 25 degrees and 75 degrees, an angle of about 35 degrees having been found particularly advantageous.

The electrical connection to the electrode 22 is made through a conductor 24 disposed within the rod 12, which is preferably of tubular form, and insulated therefrom, this conductor extending fom the handle 10 in a projection 24a forming a suitable electrical terminal. The electrical circuit for the electrode 23 extends through the rod 13 which may be a tube of conductive material and thus, itself, form one of the electrical connections. At the handle end of the rod 13, an extension 13d of the conductor 12a forms the other electrical terminal for the torch. While any suitable connections may be made to the terminals 13d and 24a, a preferred type of connector comprises a conductive tube or sleeve 40 having one or more longitudinal slots 40a, suitable supply lines 40b being soldered in the unslotted ends. This type of construction avoids the tendency of the conventional split prongs to break off in use.

Disposed within the angle between the electrodes 22 and 23 is an electromagnet 26 supported from the electrode holder 20 and provided with a winding 27 comprising a relatively few turns of heavy insulated wire. Disposed outside of the angle of the electrodes 22 and 23, and at either side thereof, are the electromagnets 28 and 30 having windings 29 and 31, respectively, also formed of a few turns of relatively heavy insulated wire and forming the support for the electromagnets. Suitable terminals 32, 33, 34, and 35 are provided for the windings 27, 29, and 31. The complete electrical circuit thus extends from the terminal 24a through the conductor 24, the winding 29 of electromagnet 28, the winding 27 of electromagnet 26 to the electrode holder 20, thence to the electrode 22 through the arc, the electrode 23, the electrode holder 21, the winding 31 of electromagnet 30, to the supporting rod 13, and thence to the other terminal 13a. It is thus seen that the windings of the electromagnets 26, 28, and 30 are all in series with the arc current so that the magnetic fields developed thereby are at all times proportional to the arc current. The magnet 26 is designed to have a magnetomotive force approximately three times that of each of the magnets 28 and 30.

While each of the electromagnets 26, 28, and 30 may be constructed in any suitable form, the preferred structure is shown in cross-sectional detail in Fig. 2, from which it is seen that each of the electromagnets comprises a magnetic core consisting of a stack of U-shaped laminations with the angle $a$ between the legs of the U approximately 65 degrees. These U-shaped magnets are so mounted that they effectively bridge the arc, having a common plane of symmetry substantially coincident with the plane including the two electrodes in their normal position.

In operation it will be assumed that, initially, the latch 19 is withdrawn so that the spring 18 biases the thumb nut 17 to the extreme right-hand position, in which position the electrodes 22 and 23 are separated by such a distance that no arc is formed between them. If the terminals 24a and 13d are then connected to a suitable source of welding current and the thumb nut 17 is actuated by the operator to its extreme left-hand position momentarily touching the electrodes 22 and 23 to strike an arc and then released against the latch 19, a working arc will be formed between the electrodes 22 and 23. If this arc is not of the proper intensity for the work at hand, the relative positions of the electrodes 22 and 23 may be adjusted by the thumb nut 17 to shorten or lengthen the arc. With any suitable adjustment, the field of the electromagnet 26 is such as to extend the arc away from the welding torch, while the fields of the electromagnets 28 and 30 are such as to concentrate the arc toward a point. Adjustment of the electrodes 22 and 23 to adjust the length of the arc generally effects a change in the value of the welding current. Since the windings of the electromagnets 26, 28, and 30 are in series with the welding current, the extending and concentrating fields vary with the welding current and are thus effective to maintain a substantially uniform and stable arc.

The nature of the field developed by the magnets 26, 28, and 30 is represented schematically in Fig. 3a, while an alternative arrangement of magnets requiring only two electromagnets and the fields developed thereby are schematically represented in Fig. 3b.

It has been found that in one embodiment of an electric welding torch in accordance with the invention, the arc was well formed for extensions of the electrodes of some ½ inch to 2½ inches beyond the poles of the magnets, thus permitting operation of the torch for a considerable interval during which some 2 inches of the electrodes may be consumed without a re-adjustment of the electrodes.

In case the welding torch is to be used for alternating current welding, it has been found preferable to make both electrode carbons of the same size. If the torch is to be used for direct current welding, it has been found preferable to make the electrode connected to the positive terminal of a larger diameter than that connected to the negative terminal. In a particular welding torch, electrodes of some ⅜ inch to ½ inch and ¼ inch to 1/16 inch have been used as positive and negative electrodes, respectively. If the welding torch is to be used exclusively for direct current welding, it will be understood that the electromagnets 26, 28, and 30 may be replaced by suitable direct current elements not requiring laminated cores, or by permanent magnets.

While there has been described what is at present considered to be the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An electric welding torch comprising, a supporting member, a pair of electrode holders supported thereby and adapted to hold a pair of current-carrying electrodes at an angle to each other and in arc-forming position, a first magnet disposed within the angle of the normal electrode positions for forming a magnetic field transverse to the normal path of the arc to extend it away from the torch, and a pair of magnets disposed on opposite sides of said normal electrode positions at an angle of less than 180 degrees and including said normal electrode positions for developing a magnetic field in the region of the arc to concentrate the arc into substantially a point.

2. An electric welding torch comprising, a supporting member, a pair of electrode holders supported thereby and adapted to hold a pair of current-carrying electrodes at an angle to each other and in arc-forming position, a first magnet disposed within the angle of the normal electrode positions for forming a magnetic field transverse to the normal path of the arc to extend it away from the torch, and a pair of magnets disposed on opposite sides of said normal electrode positions at an angle of less than 180 degrees and including said normal electrode positions for developing a magnetic field in the region of the arc to concentrate the arc into substantially a point, said magnets and said normal electrode positions having a common plane of symmetry.

3. An electric welding torch comprising, a supporting member, a pair of electrode holders supported thereby and adapted to hold a pair of current-carrying electrodes at an angle to each other and in arc-forming position, a U-shaped magnet disposed within the angle of the normal electrode positions for forming a magnetic field transverse to the normal path of the arc to extend it away from the torch, and a pair of U-shaped magnets disposed on opposite sides of said normal electrode positions at an angle of less than 180 degrees and including said normal electrode positions for developing a magnetic field in the region of the arc to concentrate the arc into substantially a point, the open ends of the U's of said magnets facing the normal arc path and U's lying substantially in planes transverse to the normal arc path.

4. An electric welding torch comprising, a supporting member, a pair of electrode holders supported thereby and adapted to hold a pair of current-carrying electrodes at an angle to each other and in arc-forming position, a first magnetic means disposed within the angle of the normal electrode positions for forming a magnetic field transverse to the normal path of the arc to extend it away from the torch, a pair of magnets disposed on opposite sides of said normal electrode positions at an angle of less than 180 degrees and including said normal electrode positions for developing a magnetic field in the region of the arc to concentrate the arc into substantially a point, and means for controlling the field of said magnetic means in accordance with the arc current.

5. An electric welding torch comprising, a supporting member, a pair of electrode holders supported thereby and adapted to hold a pair of current-carrying electrodes at an angle to each other and in arc-forming position, a first magnet disposed within the angle of the normal electrode positions for forming a magnetic field transverse to the normal path of the arc to extend it away from the torch, and a pair of magnets disposed on opposite sides of said normal electrode positions at an angle of less than 180 degrees and including said normal electrode positions for developing a magnetic field in the region of the arc to concentrate the arc into substantially a point, said first magnet having a magnetomotive force of the order of three times that of each of said pair of magnets.

BURTON L. CASNER.